US010565365B1

(12) United States Patent
Watson et al.

(10) Patent No.: US 10,565,365 B1
(45) Date of Patent: Feb. 18, 2020

(54) SYSTEMS AND METHODS FOR DATA ACCESS CONTROL USING NARRATIVE AUTHENTICATION QUESTIONS

(71) Applicant: Capital One Services, LLC, McLean, VA (US)

(72) Inventors: Mark Watson, Urbana, IL (US); Anh Truong, Champaign, IL (US); Vincent Pham, Champaign, IL (US); Kate Key, Effingham, IL (US); Austin Walters, Savoy, IL (US); Fardin Abdi Taghi Abad, Champaign, IL (US); Jeremy Goodsitt, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/281,450

(22) Filed: Feb. 21, 2019

(51) Int. Cl.
*G06F 21/45* (2013.01)
*G06F 17/27* (2006.01)
(Continued)

(52) U.S. Cl.
CPC .............. *G06F 21/45* (2013.01); *G06F 21/31* (2013.01); *G06F 40/20* (2020.01); *G10L 15/265* (2013.01)

(58) Field of Classification Search
CPC .......... G06F 21/31; G06F 21/32; G06F 21/45; G06F 21/83; G06F 2203/0381;
(Continued)

(56) References Cited

U.S. PATENT DOCUMENTS 6,243,480 B1 * 6/2001 Zhao ...................... G06F 21/10
                                                          382/100
6,434,524 B1   8/2002 Weber
(Continued)

FOREIGN PATENT DOCUMENTS

EP     0 444 351    12/1990
WO     01/71448      9/2001

OTHER PUBLICATIONS

Somayaji et al., Towards Narrative Authentication or, Against Boring Authentication, ACM (Year: 2013).*
(Continued)

*Primary Examiner* — Kambiz Zand
*Assistant Examiner* — Mahabub S Ahmed
(74) *Attorney, Agent, or Firm* — Hunton Andrews Kurth LLP

(57) ABSTRACT

A system and method for data access control using narrative authentication questions can include a server containing a database storing login credentials for an account associated with a user, and the login credentials can include a narrative authentication question and an authentication response associated with the narrative authentication question. A system and method for data access control using narrative authentication questions can include a user device in data communication with the server, and the user device can receive and transmit user input from the user. Upon receipt of a request to access the account from the user, the server can transmit the narrative authentication question to the user device, receive a user input by the user transmitted from the user device in response to the narrative authentication question, compare the user input to the authentication response stored in the database, calculate a similarity score based on the comparison, and approve the user's request to access the account if the similarity score exceeds a threshold.

16 Claims, 10 Drawing Sheets

(51) Int. Cl.
*G10L 15/26* (2006.01)
*G06F 21/31* (2013.01)
*G06F 40/20* (2020.01)

(58) Field of Classification Search
CPC ..... G06F 2221/2101; G06F 2221/2103; G06F 17/27; G06F 17/28; G06F 17/40; G10L 15/26; G10L 15/28; G10L 17/00
USPC .......................................................... 726/2
See application file for complete search history.

(56) References Cited

U.S. PATENT DOCUMENTS

| | | | |
|---|---|---|---|
| 6,581,036 B1 | 6/2003 | Varney, Jr. | |
| 6,671,672 B1* | 12/2003 | Heck ........................ | G10L 17/24 704/273 |
| 6,691,111 B2* | 2/2004 | Lazaridis ............ | G06F 17/2765 |
| 7,062,428 B2* | 6/2006 | Hogenhout ......... | G06F 17/2765 704/235 |
| 7,392,174 B2* | 6/2008 | Freeman ............. | G06F 17/2715 704/1 |
| 7,549,170 B2* | 6/2009 | Stubblefield ............ | G06F 21/36 713/183 |
| 7,693,720 B2 | 4/2010 | Kennewick et al. | |
| 7,949,529 B2 | 5/2011 | Weider et al. | |
| 8,155,962 B2 | 4/2012 | Kennewick et al. | |
| 8,346,563 B1 | 1/2013 | Hjelm et al. | |
| 8,539,242 B2* | 9/2013 | Jung ........................ | G06F 21/32 704/E17.016 |
| 8,631,486 B1* | 1/2014 | Friedman ................ | G06F 21/31 726/19 |
| 8,682,667 B2 | 3/2014 | Haughay | |
| 9,137,238 B1* | 9/2015 | Jakobsson ................ | G06F 21/31 |
| 9,218,809 B2* | 12/2015 | Bellegarda .............. | G10L 17/04 |
| 9,342,489 B2 | 5/2016 | Sethu et al. | |
| 9,792,160 B2* | 10/2017 | Shear ...................... | G06F 9/5072 |
| 9,858,039 B2* | 1/2018 | Kumar .................... | G06F 3/167 |
| 9,904,579 B2* | 2/2018 | Shear ...................... | G06F 16/245 |
| 10,073,836 B2* | 9/2018 | Allen .................. | G06F 17/2785 |
| 10,120,859 B2* | 11/2018 | Parikh .................. | G06F 17/276 |
| 10,133,650 B1* | 11/2018 | Park .................... | G06F 11/3608 |
| 10,231,122 B2* | 3/2019 | Childress ................ | G06F 21/31 |
| 2004/0001575 A1 | 1/2004 | Tang | |
| 2004/0148170 A1 | 7/2004 | Acero et al. | |
| 2005/0043940 A1 | 2/2005 | Elder | |
| 2006/0080084 A1* | 4/2006 | Shuster ................... | G06F 17/27 704/9 |
| 2006/0293921 A1* | 12/2006 | McCarthy ............ | A61B 5/6815 705/2 |
| 2007/0143625 A1* | 6/2007 | Jung ....................... | G06F 21/32 713/182 |
| 2007/0156392 A1 | 7/2007 | Balchandran et al. | |
| 2007/0261109 A1* | 11/2007 | Renaud .................... | G06F 21/31 726/6 |
| 2013/0066886 A1 | 3/2013 | Bagchi et al. | |
| 2013/0103391 A1 | 4/2013 | Millmore et al. | |
| 2013/0132091 A1* | 5/2013 | Skerpac ................ | G10L 17/005 704/273 |
| 2014/0019385 A1* | 1/2014 | Dawson .............. | G06F 17/2705 706/10 |
| 2014/0193794 A1* | 7/2014 | Olander, III ....... | G06Q 30/0203 434/362 |
| 2014/0199676 A1 | 7/2014 | Chen et al. | |
| 2014/0223547 A1* | 8/2014 | Tse .......................... | G06F 21/31 726/19 |
| 2014/0358964 A1 | 12/2014 | Woods et al. | |
| 2015/0331850 A1* | 11/2015 | Ramish ............... | G06F 17/2785 704/9 |
| 2016/0262017 A1* | 9/2016 | Lavee ..................... | G06F 21/31 |
| 2017/0053108 A1* | 2/2017 | Jakobsson ........... | H04L 63/0861 |
| 2018/0014189 A1* | 1/2018 | Ellison .................. | H04W 12/06 |
| 2018/0068103 A1* | 3/2018 | Pitkanen ............. | H04L 63/0861 |
| 2018/0089383 A1* | 3/2018 | Allen ...................... | G16H 15/00 |
| 2018/0124033 A1* | 5/2018 | Greenspan ........... | H04L 63/083 |
| 2018/0191713 A1* | 7/2018 | Bhaya ................. | H04L 63/0861 |
| 2018/0205726 A1* | 7/2018 | Chari ................... | H04L 63/0861 |
| 2018/0357221 A1* | 12/2018 | Galitsky ............. | G06F 17/2785 |
| 2019/0095596 A1* | 3/2019 | Manganelli ............. | G06F 21/31 |
| 2019/0236085 A1* | 8/2019 | Galitsky ................. | G10L 15/08 |
| 2019/0251165 A1* | 8/2019 | Bachrach ................ | G06N 5/02 |

OTHER PUBLICATIONS

Connor C. Hoover, Narrative Passwords: Potential for Story-Based User Authentication, Master's Thesis, Downloaded from ProQuest (Year: 2015).*

Hoover, Narrative Passwords: Potential for Story-Based User Authentication, MS Thesis—University of Idaho, Source ProQuest (Year: 2015).*

Somayaji et al., Towards Narrative Authentication, ACM, Source—google.com (Year: 2013).*

* cited by examiner

Method (200)

Method (300)

Application Interface 510

Application User Interface (500)

Security Question Interface 520

Application
User Interface (500)

Follow-Up Question Response Entry Interface 550

Application
User Interface (500)

SYSTEMS AND METHODS FOR DATA ACCESS CONTROL USING NARRATIVE AUTHENTICATION QUESTIONS

FIELD OF THE INVENTION

The following description relates to data access control systems using narrative authentication questions and methods for data access control.

BACKGROUND ART

With the advent of the Internet and advancements in electronic commerce, online accounts have become an important part of daily life. Online accounts can facilitate interactions between service providers and users, users can access these accounts from any place at any time, and thus online accounts offer an unsurpassed level of convenience for the users. However, as online accounts have become popular, computer networks are facing new challenges. For example, in the pre-Internet era, physical access to a computer network was necessary for an unauthorized access. These networks often provided a high level of security and isolation against unauthorized access, because maintaining the security of a hosting facility was relatively easy.

However, the Internet has made it possible to access these networks from almost anywhere in the world. As a result, physical access to computer networks is no longer necessary to manipulate or exploit their content. Therefore, new groups of sophisticated criminals, many of whom live outside the jurisdiction of the law enforcement of this country, have become active. Often, these criminals orchestrate attacks on the computer networks of companies, universities, and other institutions, and steal sensitive or valuable information. In many cases, the attackers gain access to the networks by obtaining the usernames and passwords of unsuspecting users. In view of these and other deficiencies, maintaining the security of online accounts has become an important task for administrators of computer networks.

SUMMARY OF THE INVENTION

In many cases, an online (or offline) account has a username and password to restrict access to the account, and an ever-expanding number of service providers allow their customers to receive services through online accounts. As consumers utilize an increasing number of online accounts, remembering a variety of usernames and passwords for these accounts has become a daunting task, and often results in the use of simple or repetitive passwords. An average user of online services now has to remember an ever-increasing number of usernames and passwords.

In addition, many service providers require users to create accounts that follow certain rules and guidelines, e.g., include numbers, symbols, and upper case characters in the username or password. These rules and guidelines require the users to create usernames and passwords that are not personal to and memorable for the user. While various methods of storing the usernames and passwords, such as list passwords in a paper or electronic file, can aid forgetful users, this can reduce account security and can make an account more susceptible to being compromised. Since a password list may include passwords for a plurality of accounts, these practices also increase the risk that multiple accounts associated with a user may be compromised.

In some cases, the users are prohibited by law from writing their username or password. Given the increasing number of usernames and passwords that the users have to remember, and that the combinations used in the usernames and passwords are not easy to remember for users, it is very likely that users forget their usernames or passwords. As a result, resetting the username or password, and handling the volume of requests to do so, have become very common problems for administrators of computer networks.

Various techniques have been proposed for resetting the password (or username) for an online account. Some service providers ask users predetermined questions (or security questions), and if the user responds to these questions correctly, the service provider resets the password. For example, while setting up an online account, the service provider asks the users several predetermined questions, such as the user's mother's maiden name. In order for the user to set up the account, the user has to answer these questions and the service provider stores the answers. Later, if the user wants to reset the password of the user's account, the user will be prompted with some or all of the same questions. Upon providing the pre-stored answer, the account will be reset. This method of resetting account passwords is helpful because it instantaneously resets the user's password. Service providers also prefer this method because the resetting can be done automatically, i.e., the process requires minimal human input on the part of the service provider.

However, there are a few drawbacks to this method. First, this method is not very secure because the answers to many of the predetermined questions are available online. For example, a hacker might be able to guess some of these answers by searching the web (or the dark web) and might attempt to reset the password for the user. Moreover, with creation of black markets for selling personal information of users, hackers might capitalize on this information to guess a user's answer to these questions. Second, the users might forget the answers to the questions or the users' answers to the questions might change over time.

Some service providers allow the users to customize the reset questions so that the questions are not predetermined. For example, a user can draft a security reset question and provide the answer to the question to the service provider. This method is helpful because the more particularized the question is the less likely the answer would be available to a hacker. However, in this day and age, all of service providers are susceptible to online attacks and hacking attempts, and if the service provider is hacked, the answer to these questions can be compromised. Moreover, the more particularized the question and the answer to the question are, the more likely that the user would forget them. Therefore, if the user attempts to recover the user's password after several years, it is very likely that the user would not remember the answer to the proposed question.

Some of these problems stem from the fact that the answers to these security questions (or predetermined questions) are static. In other words, in response to these questions (whether determined by the website or posed by the user), a user is required to provide a specific phrase or term, and unless the user provides the same exact phrase or term, the user will not be able to access the account. For example, if the user is asked to identify the user's favorite movie, the user has to provide the exact name of the movie. Otherwise, the user will not be able to access the account.

These problems described above are not limited to resetting a password for an account, and many websites ask the users security questions for various purposes. For example, if a user is attempting to access the user's account from a computer for the first time (i.e., a computer with an IP address not registered at the website for the user's account), the user can be asked to answer one or more security questions to verify the identity of the user. Because the user is seeking to access the website from a new IP address, these websites seeks to foreclose the possibility that a hacker is seeking to access the account from the hacker's computer. In some instances, these websites ask users security questions prior to conducing major transactions, even when the user is accessing the website from a known IP address.

It is an object of the present disclosure to describe a method, apparatus and system (hereinafter referred to collectively as "technique") for overcoming these shortcomings. In particular, a data access control technique which can receive a narrative as a response to a security question is disclosed.

The use of a narrative response to a security question can provide a number of benefits over traditional methods of account security. For example, a narrative response can be based on facts known to a user and can be easier for a user to remember than a password comprising a string of letters, numbers, and/or special characters. The user may not need to repeat the narrative response exactly each time, as is required with a password, which can reduce the number of attempts necessary to authenticate the user and improve the user's experience during the authentication process. For users with impaired or limited dexterity, motor skills, or typing skills, a narrative response may be easier to provide. Further, since users are more likely to remember and repeat a narrative response within an acceptable level of precision than exactly enter a password, the user will need to restore or replace forgotten or lost passwords much less often.

As another example, a narrative response can be more secure than a password. A narrative response can be based on a user's personal recollection of an event or thing, which can be difficult for an attacker to obtain, likely more difficult to obtain than a password, and less susceptible to hacking. As users often write down a list of passwords relating to multiple accounts, an attacker that obtains such a list could put a number of accounts at risk. Further, the security questions and narrative responses can vary in complexity from account to account more easily than a password, and any user can potentially have a very large number of narrative responses that can be easily recalled. In contrast, passwords are often a compilation of words, numbers, and special characters, and users often have a tendency to use the same or similar passwords for multiple accounts.

In an example embodiment, a login page for an account can be displayed on or accessed through a user interface of a user device. The user interface can receive a command from the user. In one embodiment, the command can be a voice command provided in response to a security question displayed on the user interface of the user device. The user device can transmit the command to a server. In one embodiment, the command can be converted into a signal and transmitted to the server.

The server can include a module for analyzing the command. For example, the module can use a natural language processing ("NLP") technique to analyze the user's command. The server can compare the user's command to a response stored in a database of the server. The server can further calculate a similarity score based on the comparison. If the similarity score exceeds a threshold value, the server can approve the user's request to access the account. Upon the approval of the request, the server can transmit a signal to the user device. In one embodiment, based on the transmitted signal, the user device can display a set of information on the user interface of the user device.

In one embodiment, the user device can analyze the user command and transmit a signal to the server based on the analyzed command. For example, a user can provide a voice command or narrative to the user device and the user device can transcribe the command. Subsequently, the user device can transmit a transcription of the command to the server. As another example, the user device can include a module which can use a NLP technique to analyze the command. The user device can transmit a result provided by the module to the server.

The similarity score can be calculated by identifying one or more nouns present in both the command and the response stored in the database; identifying one or more relationships between nouns present in both the command and the response; identifying one or more speech matches between the command and the response, wherein the one or more speech matches include at least one of a similarity in articulation, a similarity in diction, and a similarity in tone; increasing the similarity score for each noun present in both the command and the response, each relationship present in both the command and the response, and each speech match; identifying one or more nouns present in the command and not present in the response; identifying one or more relationships between nouns present in the command and not present in the response; identifying one or more speech characteristics present in the command and not present in the response; decreasing the similarity score for each noun present in the command and not present in the response, each relationship present in the command and not present in the response, and each speech characteristic present in the command and not present in the response.

The data access control technique disclosed herein can enable the users to provide secure answers to security questions. These answers can require knowledge that is unique to the user and not available on the Internet. As a result, this technique enhances current systems by preventing unwanted or illegal access to the accounts. Moreover, users can better remember descriptive or narrative responses as opposed to passwords or specific answers to questions.

BRIEF DESCRIPTION OF THE DRAWINGS

A more complete appreciation of the present disclosure, and many of the attendant advantages thereof, will be readily apparent as the present disclosure becomes better understood by reference to the following detailed description when considered in conjunction with the accompanying drawings, in which like reference symbols indicate the same or similar components, wherein.

DETAILED DESCRIPTION OF THE INVENTION

Figure 1:
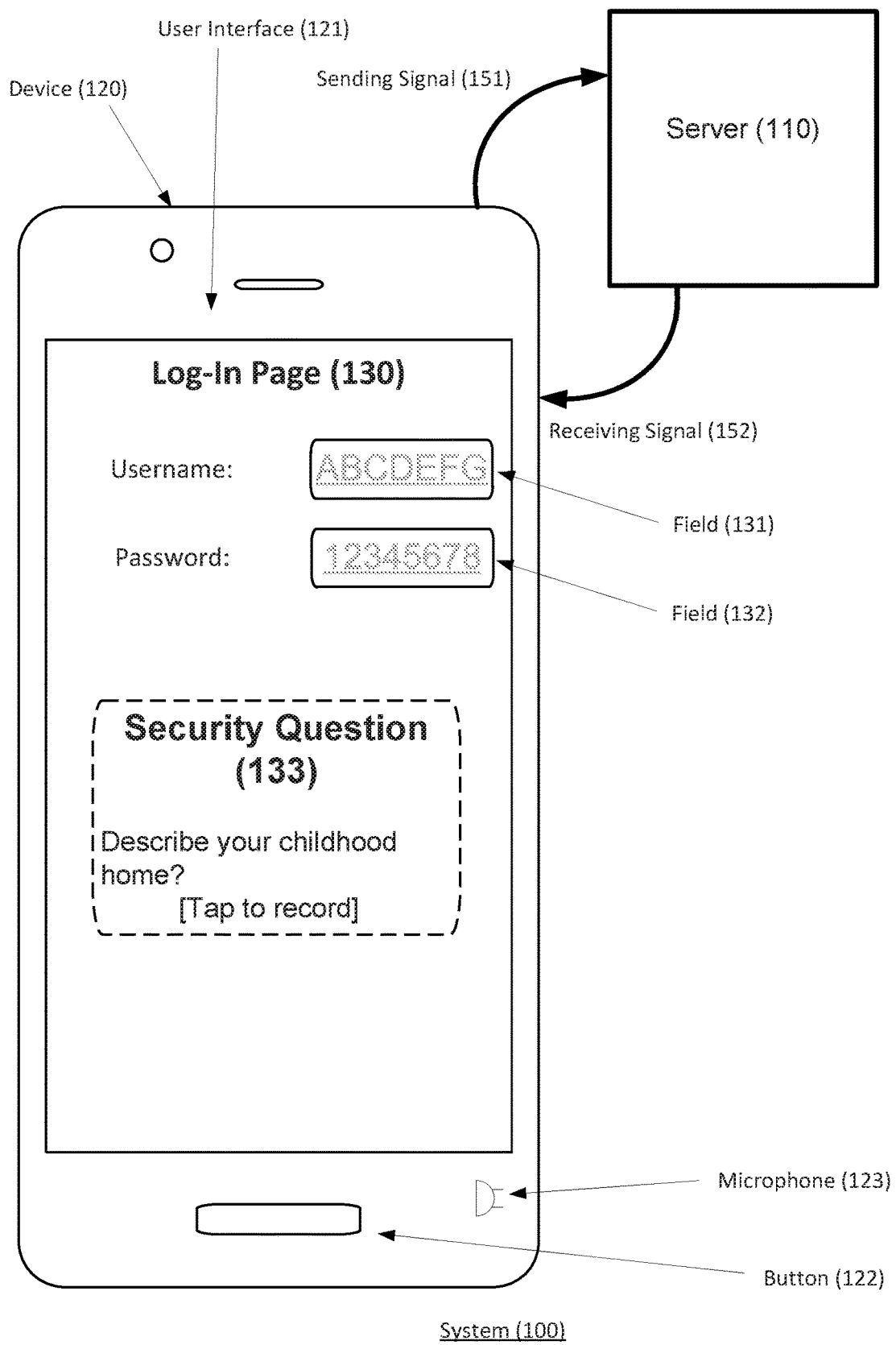
FIG. 1 illustrates a data access control system according to an example embodiment.

The general inventive concept is described more fully below with reference to the accompanying drawings, in which exemplary embodiments of the present disclosure are shown. As those skilled in the art would realize, the described embodiments may be modified in various different ways, all without departing from the spirit or scope of the present disclosure. The present disclosure should not be construed as being limited to these embodiments. Accordingly, the drawings and description are to be regarded as illustrative in nature to explain aspects of the present disclosure and not restrictive. Like reference numerals in the drawings designate like elements throughout the specification, and thus their description have not been repeated.

FIG. 1 depicts a data access control system 100 as an exemplary embodiment of the present disclosure to which a method of data access control is applied. The data access control system 100 can include a server 110 and a device 120.

The server 110 can be a dedicated server computer, such as a bladed server, or can be a personal computer, laptop computer, notebook computer, palm top computer, network computer, mobile device, or any processor-controlled device capable of supporting the data access control system 100.

In an example embodiment, the server 110 can include a database for storing user information. For example, for each user, the database can store information such as a username, a password, at least one security question, a response to the at least one security question, and optionally personal information for the user (e.g., name, address, etc.). The server can also include a software program or module, which when executed by a processor of the server can implement various natural language processing ("NLP") techniques as described herein. The server 110 can include various transceivers for sending a signal 152 to the device 120 and receiving a signal 151 from the device 120.

In one embodiment, the server 110 can include a software program or module for converting an audio file into text. For example, if a user provides a voice command to the device 120, the device can transmit the voice command to the server 110, and the server 110 using the module for converting an audio file into text (i.e., transcriber module) can convert the command into text. The server 110 can also, using the NLP module, analyze the narrative included in the command. In some embodiments, the NLP module is the same as the transcriber module. In other embodiments, the NLP module and the transcriber module are separate and distinct modules.

In an example embodiment, the device 120 can be a cellphone, tablet, computer, laptop, desktop, wearable device, smart device, etc. The device 120 can display a user interface 121. The device 120 can receive a command from a user of the device. For example, the device 120 can receive a command through the user interface 121, a button 122 or the microphone 123. The device 120 can be in data communication with the server 110. The device 120 can receive and transmit user input or commands using wired or wireless data communication. For example, the device 120 can include various transceivers for sending a signal 151 to the server 110 and receiving a signal 152 from the server 110. The device 120 can include a processor and memory for generating, storing, processing or providing information associated with the data access control system described herein.

In an example embodiment, the user interface 121 can display a log-in page 130, which can include a username field 131 and a password field 132. The user interface 121 can receive a username and password from a user and the device 120 can transmit the username and password to the server 110. In some embodiments, after receiving the username and password, the server 110 can look up an account associated with the user and retrieve a security question relating to the account. The server 110 can transmit the security question to the device 120. The user interface 121 can display the security question 133 in the log-ion page 130. The user interface 121 can also receive a command from the user in response to displaying the security question 133. For example, in one embodiment, the user can tap on the security question 133 to record a narrative, e.g., a few sentences describing the user's childhood home. The recording can be done using the microphone 123. In another embodiment, the user can provide the narrative in the form of a text, i.e., the user can type the narrative. After receiving the command at the device 120, the device 120 can transmit the command to the server 110.

In an example embodiment, the server 110 can include a module which can conduct an auditory or textual conversation with a user of the device 120. The module can be a chatbot, talkbot, chatterbot, Bot, IM bot, interactive agent, or Artificial Conversational Entity. The device 120 can include a user interface which can receive an auditory or textual command, and transmit the command to the chatbot module of the server 110. For example, the user can indicate to the chatbot that the user intends to log into the user's account. The chatbot can ask the user to provide the user's username and password. The chatbot can also ask the user the security question associated with the user's account. The device 120 can display the security question to the user or it can read the question to the user. In response, the user can provide a narrative to the device 120, which can transmit to the server 110 for further analysis.

In an example embodiment, the server 110 can receive the command, and using the NLP module, the server 110 can analyze the content of the command. For example, the NLP module can compare the command to a response stored in the database in association with the user's account, and based on the comparison, determine a similarity score for the command and the response.

These embodiments can offer improved security against fraud and ease of use benefits over passwords and other conventional methods of account security. For example, narrative responses to security questions can be based on unique known only to a particular user and vary widely between users and the specific security questions asked. Passwords, in contrast, can often be predictable, based on information accessible by more people than the user alone, and users frequently use the same passwords for many accounts. In addition, narrative responses are more easily remembered than passwords and less susceptible to loss, theft, or being forgotten.

Natural language processing (NLP) technology is capable of processing and analyzing natural language data, which can involve speech recognition, natural language understanding, and natural language generation. The NLP module can include software which when executed by a processor can perform tasks associated with processing and analyzing natural language data. For example, the NLP module can include different submodules, such as natural language understanding (NLU) submodule, natural language generation (NLG) submodule, and Sentiment Analysis submodule. The NLU submodule can process incoming text and derive meaning from the text. The NLG submodule can take a meaning that is to be communicated and express that meaning in appropriate text. The Sentiment Analysis submodule can determine a polarity and topic of a text that expresses feelings or opinions.

In one example embodiment, the NLP module can identify nouns in sentences. The NLP module can also determine human names, city names, company names, etc. These nouns can be stored in a knowledge graph database (e.g., of the server 110). The NLP module can also determine relationships between the nouns in a sentence. These relations between nouns and actions in the user's responses is also stored in the graph database.

In an example embodiment, a user can sign up for an account with a service provider. The service provider can require the user to visit the service provider's website to sign up for the account. The website can have a link, a button, a web page or other surfing indicia which can direct the user to enter the user's information. This information, for example, can include a name, email address, username, password, security question and response to the security question. In some embodiments, the signing up process can take place using an application (or app) of the service provider.

In an example embodiment, the security question can ask a user to describe an object, person, place or phenomenon. For example, a security question can be "tell me about your favorite uncle?" As another example, a security question can be "tell us about the street where you grew up?"

In an example embodiment, the user can provide a response to the security question. The response can be an auditory or textual narrative (e.g., an oral response or a typed response). The response to the security question can be stored in a database of the server. For example, in response to the question "tell me about your favorite uncle," the user can describe the user's favorite uncle. The response can include one or more nouns and there can be at least one relationship between the nouns.

Security questions which require narrative or descriptive responses and the narrative or descriptive responses thereto can be more secure than the traditional static responses. An unauthorized attacker might be able to ascertain static responses to security questions, e.g., by searching the Internet. However, the unauthorized attacker might not be able to discover descriptive or narrative responses by searching the Internet, e.g., because these responses do not exist on the Internet.

Once the user provides the information requested on the website (or app) of the service provider, the user can transmit the information to the service provider, i.e., the server. For example, the user's device can have a user interface which displays the website of the service provider. This user interface can include a link, button or other indicia for the user to request transmission of the information to the service provider.

Upon receiving this information at a server of the service provider, the service provider can decide to open up the account for the user. This decision can be based on, e.g., whether the user's information exists in the system. This decision can also be based on whether the user's username exists in the system or whether the password meets the minimum requirements indicated on the service provider's website.

Once the sign-up process is completed, e.g., when the server of the service provider approves the username and password of the user, the user's information can be stored in the database of the server, e.g., the name, email address, username, password, security question and response to the security question can be stored in the database. The user can also be notified that an account has been created. This notification can be displayed on the user interface of the device. Subsequently, the user can log into the online account of the user and visit the user's information or request services.

In an example embodiment, the user can be presented with a security question as part of a process for accessing a user's account, e.g., when logging into the account, logging into the account from a new device, resetting the password for the account, etc. In one embodiment, the user chose this security question when the user signed up for the account. The security question can ask the user to describe an object, place, person, etc., or to provide a narrative. The user can be asked to provide a command in response to the security question. The command can be any natural human language input, for example, one or more of voice input and text input. The text input can be text messages (e.g., Short Message Service (SMS) text messages), emails containing text, direct text entry, electronic messages, and so on. In one embodiment, the command can be a description or narrative. In one embodiment, the command can be a user input.

In one embodiment, the user command can be a voice command. For example, the device 120 can transmit the voice command to the server 110. The server 110 can convert the voice command into a text file and provide the file to the NLP module in the server 110. The NLP module of the server 110 can determine at least one of articulation, diction, and tone of the voice command. This may be accomplished using e.g., pattern recognition techniques or other methods of assessing speech or vocal input. The NLP module can also compare the at least one of articulation, diction, and tone of the voice command to the stored response. As another example, the device 120 can convert the voice command into a text file. Subsequently, the device 120 can transmit the text file to the server 110, and the server 110 can provide the file to the NLP module.

In one embodiment, the NLP module can calculate a similarity score based on a comparison or matching between the command and the stored response. If the similarity score exceeds a threshold value, the server can approve the user's request to access the account. Upon an approval of the request, the server can transmit a signal to the device 120.

The NLP module can identify one or more nouns in the command and one or more nouns in the stored response as well as relationships between nouns. The NLP module can compare the nouns and relationships between nouns in the command and the response. The NLP module can also match the nouns and relationships between nouns in the command to the nouns in the stored response. Based on the comparison and matching, the NLP module can calculate a similarity score between the command and the stored response. The NLP module can increase the similarity score by a first amount for each noun and relationship between this noun and other nouns in the command that match to a noun and relationships for that noun in the response. The NLP module can also increase the similarity score for each noun that is synonym to a noun in the response.

In one embodiment, the command can contain a first plurality of nouns and the stored response can contain a second plurality of nouns. The NLP module can identify one or more relationships between the first plurality of nouns in the command. The NLP module can also identify one or more relationships between the second plurality of nouns in the response. The NLP module can match the relationships in the command to the relationships in the response. Based on this matching, the NLP module can calculate a similarity score between the command and the stored response. In an example embodiment, the NLP module can match one or more relationships between the first plurality of nouns in the command to one or more relationships between the second plurality of nouns in the response. The NLP module can increase the similarity score by a second amount for each relationship in the command matched to a relationship in the response. The second amount can be greater than the first amount.

In an example embodiment, the relationship between a plurality of nouns included in the command or the relationship between a plurality of nouns included in the response can be a semantic relationship. The NLP module can detect the semantic relationship. For example, the NLP module can detect nouns, like human names, city names, company names, and specific objects like a tree, a house, etc., as well as semantic relationships between these types of nouns.

In one embodiment, synonym substitution can be a semantic relationship. For example, "evergreen tree behind my house" can be the same as "evergreen tree behind my home", or "evergreen tree behind my residence." The NLP module, using sentiment analysis, can make up new sentences based on the command and generative summarization. The semantic relationship can be detected by a combination of one or more third-party applications, such as a Knowledge Graph, black box models, and/or the University of Princeton's public domain WordNet. The third-party application can be a part of the NLP module or a separate application in communication with the NLP module.

In one embodiment, the similarity score can be calculated based on the semantic relationship between the words included in the command and the words included in the response. For example, a response can include a house, a tree, a back yard, and a narrative sentence that the tree is behind the house. The NLP module can calculate a high similarity score if the command also has a semantic relationship that the tree is behind the house. If the command only includes the words tree and house, the similarity score can be lower.

In one embodiment, the NLP module can compare the nouns included in the response and the command. The NLP module can identify one or more nouns in the response (or command) that are not present in the command (or response). The NLP can decrease the similarity score by a third amount for each noun in the response that is not present in the command.

In another embodiment, the NLP module can compare the relationships included in the response and the command. The NLP module can identify one or more relationships in the response (or command) that are not present in the command (or response). The NLP can decrease the similarity score by a fourth amount for each relationship in the response that is not present in the command.

For example, the security question can ask the user to describe the user's childhood home. The response can include a yellow door and that the yellow door was in the backyard. The response can also include a basketball hoop and that the basketball hoop was in the backyard. The command provided by the user can include a yellow door and that the yellow door was in the backyard. However, the command does not include a basketball hoop or that the basketball hoop was in the backyard. The NLP module can increase the similarity score by the first amount for each noun matching between the command and the response, e.g., the yellow door. Similarly, the NLP module can increase the similarity score by the second amount for each relationship matching between the command and the response, e.g., the yellow door being in the backyard. Additionally, the NLP module can decrease the similarity score by the third amount for each noun missing in the response or command, e.g., the basketball hoop. Similarly, the NLP module can decrease the similarity score by the fourth amount for each relationship missing in the response or command, e.g., the basketball hoop being in the backyard.

As another example, the server can decrease a similarity score when the command includes nouns or relationships that are missing in the response stored in the database. In this example, long commands by the user can adversely affect the similarity score. This can enhance the security of the system because it prevents a user from providing excessively long commands.

In an example embodiment, the NLP module can ask a follow-up question based on a comparison between the command and the response stored in the database. For example, if a noun is included in the response but the noun is missing in the command, the NLP module can ask a follow up question about the noun, e.g., if the command does not include the basketball hoop, the NLP can ask the user if there was any sports equipment in the user's home. As another example, if a relationship is included in the response but the relationship is missing in the command, the NLP module can ask a follow up question about the relationship, e.g., if the command does not state that the basketball hoop was in the backyard, the NLP can ask the user where the basketball hoop was in the user's home.

Figure 2:
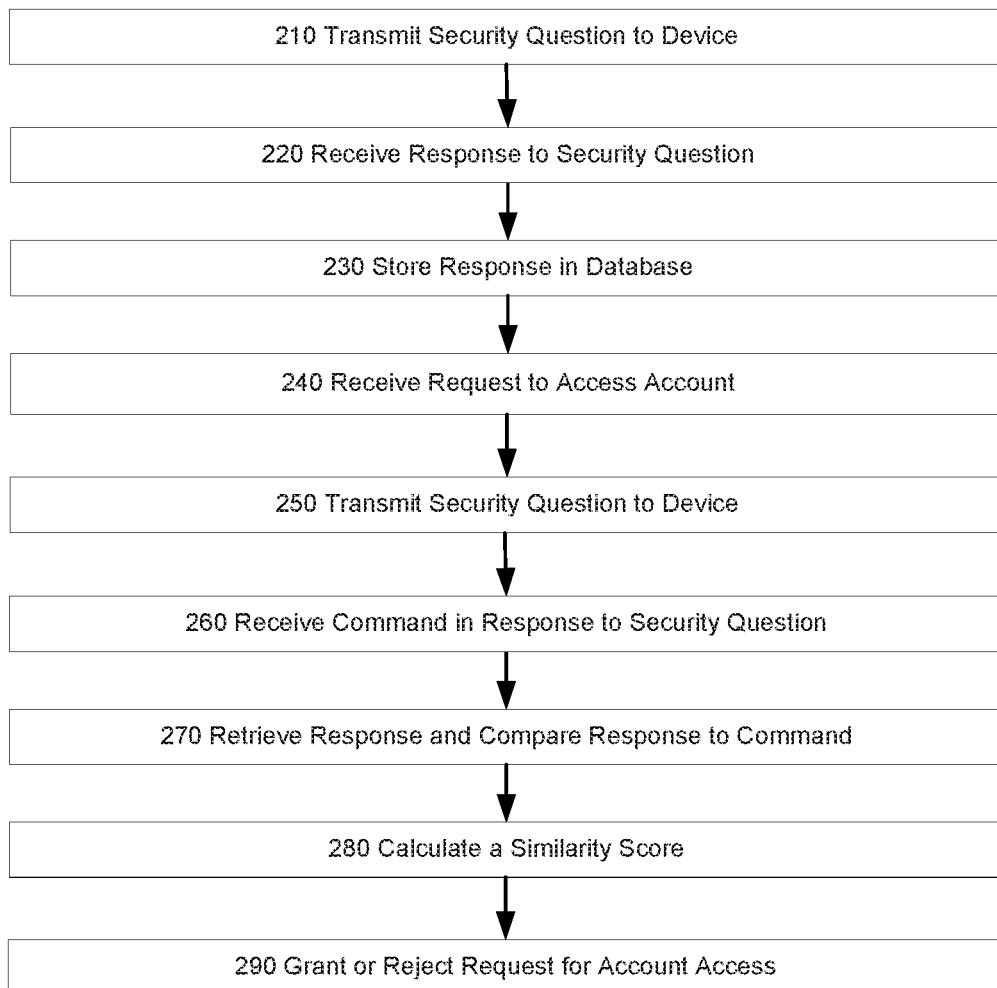
FIG. 2 is a flowchart illustrating a method of data access control for a user account according to an example embodiment.

FIG. 2 is a flowchart illustrating a method 200 of data access control for a user account in accordance with an exemplary embodiment. Method 200 may reference the same or similar components as illustrated in FIG. 1.

In some examples, the method 200 may commence with step 210 during the account sign-up process. In step 210, the server transmits a security question to the device. In step 220, the server receives a response to the security question. In step 230, the server stores the response in a database of the server. The response is stored in association with the security question and an account of the user.

In step 240, the server receives a request from the device to access the account. In response, in step 250, the server transmits the security question to the device. In step 260, the server receives a command from the device. The command can be a voice input describing an object, for example.

In step 270, the server retrieves the response stored in the database in association with the account and compares the response to the command. In step 280, the server calculates a first similarity score based on the comparison in step 270. If the first similarity score exceeds a threshold value, in step 290, the server grants the user access to the account, e.g., by transmitting a message to the device. Otherwise, in step 290, the server can reject the user's request for accessing the account.

In an example embodiment, in step 270, comparing the command to the response can include identifying one or more nouns present in both the command and the response. In step 280, while calculating the similarity score, the server can increase the similarity score for each noun present in both the command and the response.

In another example embodiment, in step 270, the comparing the command to the response can include identifying one or more nouns present in response and not present in the command. In step 280, while calculating the similarity score, the server can decrease the similarity score for each noun present in the response and not present in the command.

In another example embodiment, in step 270, the comparing the command to the response can include identifying one or more relationships between nouns present in both the command and the response. In step 280, while calculating the similarity score, the server can increase the similarity score for each relationship present in both the command and the response.

In another example embodiment, in step 270, the comparing the command to the response can include identifying one or more relationships between nouns present in the response and not present in the command. In step 280, while calculating the similarity score, the server can decrease the similarity score for each relationship present in the response and not present in the command.

Figure 3:
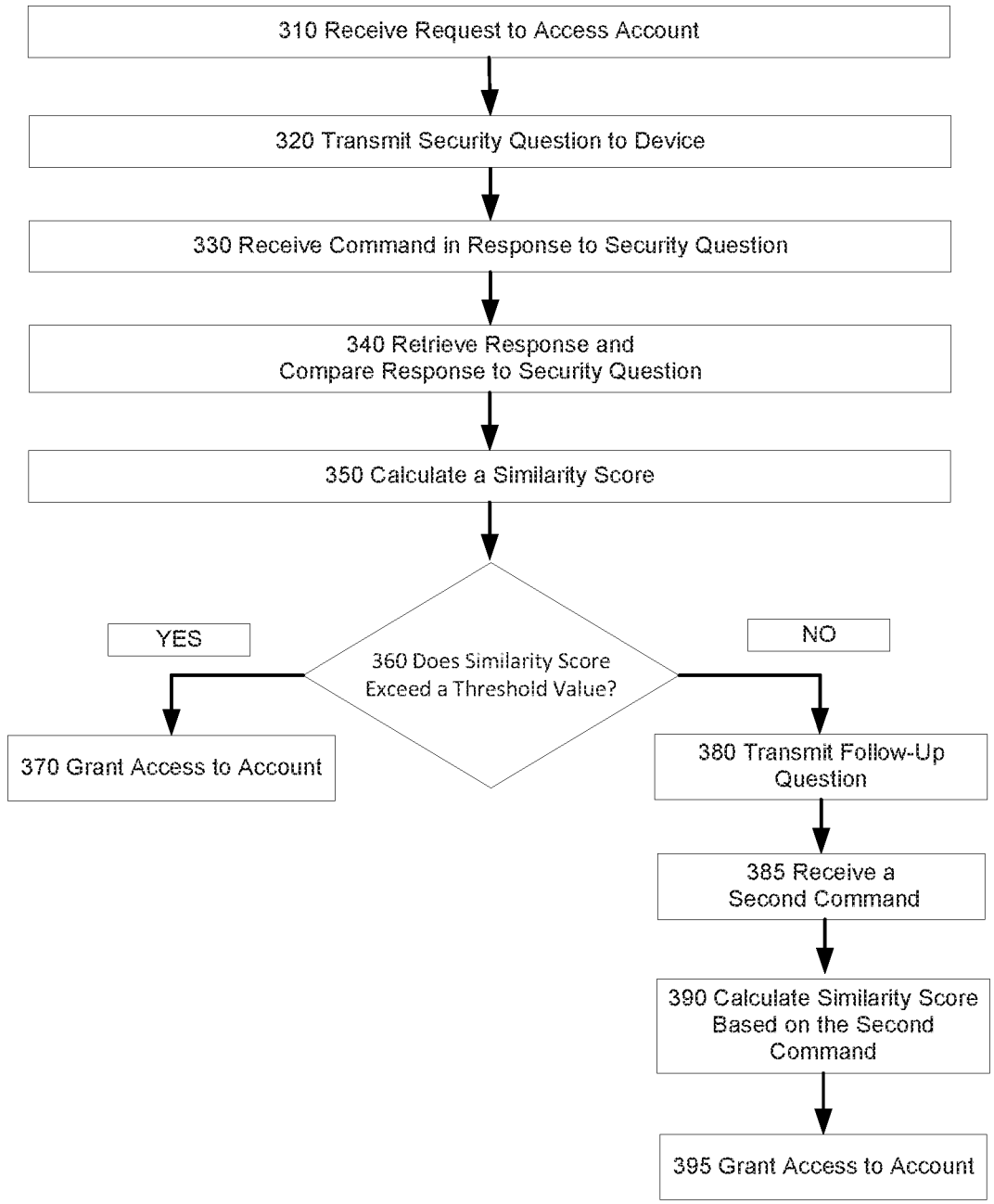
FIG. 3 is a flowchart illustrating a method of data access control for a user account according to an example embodiment.

FIG. 3 is a flowchart illustrating a method 300 of data access control for a user account in accordance with an exemplary embodiment. Method 300 may reference the same or similar components as illustrated in FIG. 1.

In this example embodiment, the method 300 may commence after receiving and storing the user response (to a security question) at the server, with in step 310, where the server can receive a request from the device to access an account. The request can be for, e.g., resetting the user's password for the account or for logging into the account from a new device.

In response, in step 320, the server can transmit the security question to the device. In step 330, the server can receive a command (e.g., voice command including a narrative) from the device, and in step 340, the server can retrieve the stored response and compare it to the command.

In step 350, the server can calculate a similarity score based on the comparison of the command to the response. In step 360, the server can determine if the similarity score exceeds a threshold value. If the similarity score exceeds the threshold value, the server can grant the device access to the account at step 370. The server can also transmit a message to the device indicating that access is granted.

The method 300 can proceed to step 380 if the similarity score does not exceed the threshold value. In step 380, the server can transmit a follow-up question to the device. The follow-up question can be based on the nouns or relationships between the nouns missing in the command when the command is compared to the response.

In step 385, the server can receive a second command from the device. The second command can be in response to the follow-up question. In step 390, the server can calculate a second similarity score, which can be based on the command and the second command. For example, the server can combine the command and the second command and calculate the second similarity score based on the combination.

In step 395, if the second similarity score exceeds the threshold value, the server can grant access to the device. Otherwise, the server can deny access to the device.

In another example embodiment, the follow-up question can be a dynamic question, i.e., it can be determined based on a comparison of the command and the response. In another embodiment, the follow-up question can be a predetermined question. For example, during the sign-up process, the user can be presented with the follow-up question and the user can provide a response to the follow-up question. In step 380, the server can transmit the predetermined question as the follow-up question to the device. In step 385, the server can receive a second command, and in step 390, the server can calculate a second similarity score. In one example, the second similarity score can be based on the second command only. In another example, the second similarity score can be based on a combination of the command and the second command. In step 395, the server can grant access to the account if the second similarity score exceeds the threshold value.

In one embodiment, a similarity score can be a combination of similarity scores. For example, if the server receives a command and a second command from the device the server can calculate a combination similarity score. In one example, the combination similarity score can be a similarity score for the combination of the command and the second command. In another example, the combination similarity score can be an average or a weighted average for the similarity score for the command and the similarity score for the second command.

Figure 4:
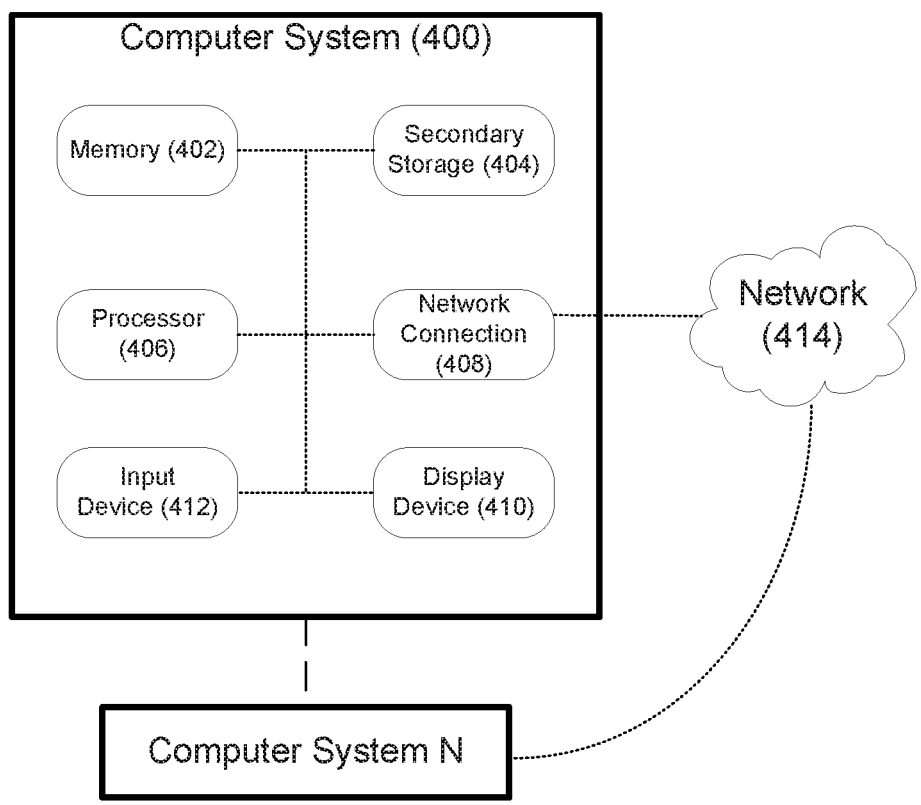
FIG. 4 illustrates hardware components of a data access control computer system according to an example embodiment.

FIG. 4 illustrates exemplary hardware components of a data access control computer system 400. The computer system 400, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 400, may run an application (or software) and perform the steps and functionalities described above. Computer system 400 may connect to a network 414, e.g., Internet, or other network, to receive inquires, obtain data, and transmit information and incentives as described above.

The computer system 400 typically includes a memory 402, a secondary storage device 404, and a processor 406. The computer system 400 may also include a plurality of processors 406 and be configured as a plurality of, e.g., bladed servers, or other known server configurations. The computer system 400 may also include a network connection device 408, a display device 410, and an input device 412.

The memory 402 may include RAM or similar types of memory, and it may store one or more applications for execution by processor 406. Secondary storage device 404 may include a hard disk drive, floppy disk drive, CD-ROM drive, or other types of non-volatile data storage. Processor 406 executes the application(s), such as those described herein, which are stored in memory 402 or secondary storage 404, or received from the Internet or other network 414. The processing by processor 406 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 400 may store one or more database structures in the secondary storage 404, for example, for storing and maintaining the information necessary to perform the above-described functions. Alternatively, such information may be in storage devices separate from these components.

Also, as noted, processor 406 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 400.

The input device 412 may include any device for entering information into the computer system 400, such as a touchscreen, keyboard, mouse, cursor-control device, microphone, digital camera, video recorder or camcorder. The input and output device 412 may be used to enter information into GUIs during performance of the methods described above. The display device 410 may include any type of device for presenting visual information such as, for example, a computer monitor or flat-screen display (or mobile device screen). The display device 410 may display the GUIs and/or output from sub-system components (or software).

Examples of the computer system 400 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 400 is shown in detail, system 400 may use multiple computer systems or servers as necessary or desired to support the users and may also use back-up or redundant servers to prevent network downtime in the event of a failure of a particular server. In addition, although computer system 400 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 400, to perform a particular method, such as methods described above.

FIGS. 5A-5F illustrate a series of user interfaces displayed on the application user interface 500 of a client device involved in accessing an account according to an example embodiment. The application user interface 500 may be displayed on any client device described herein, including without limitation a smartphone, tablet computer, laptop computer, and a desktop computer, or any other device where an account management application has been installed or may be deployed.

Figure 5A:
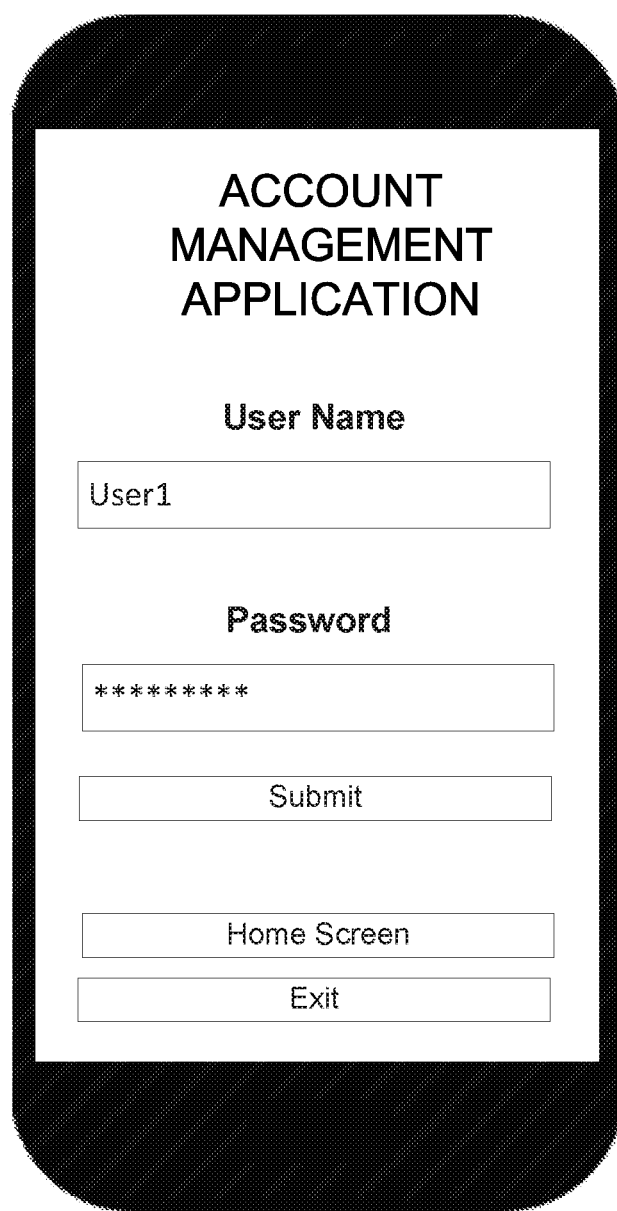
FIGS. 5A-5F illustrate application user interfaces according to example embodiments.

As shown in FIG. 5A, the application user interface 500 can present an application interface 510 showing an initial login screen for an account management application. The application interface 510 can be the first screen in the process of accessing an account via the account management application and can display, without limitation, fields for the entry of a user name, password, and any other identification or security credentials necessary to access the account.

Figure 5B:
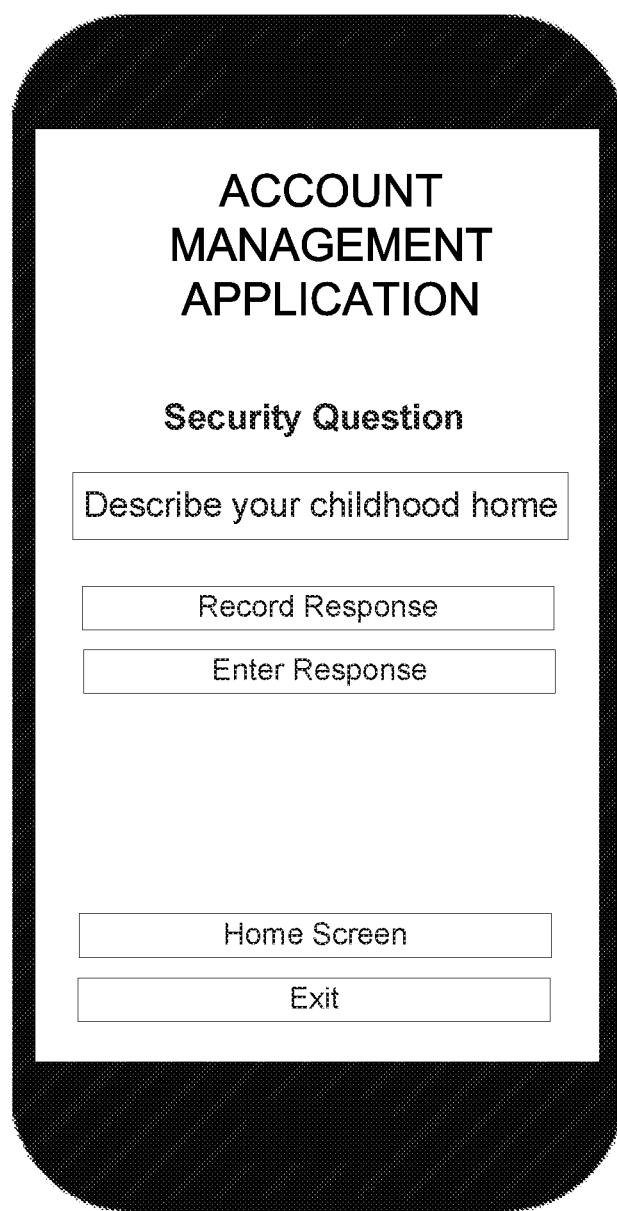

As shown in FIG. 5B, the application user interface 500 can present a security question interface 520. This interface can present one or more security questions, and offer a user choices for the manner in which these questions may be answered. For example, as shown in FIG. 5B, the user may tap the "Record Response" button to provide an oral answer to the security question, and an "Enter Response" to allow the user to type a response. It is understood that this description is exemplary and non-limiting, and the present disclosure includes other methods of entering a response to a security question.

Figure 5C:
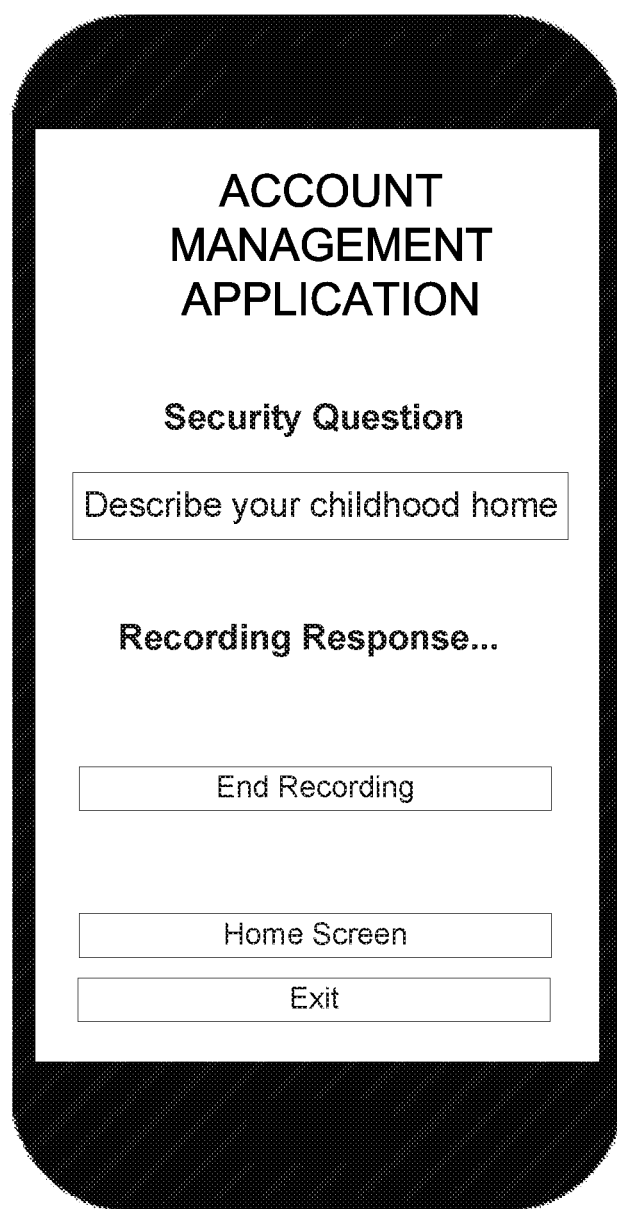

As shown in FIG. 5C, the application user interface 500 can present a response entry interface 530, through which the user can enter a response to the security question. In the example illustrated in FIG. 5C, the user has chosen to record an oral response to the security question.

Figure 5D:
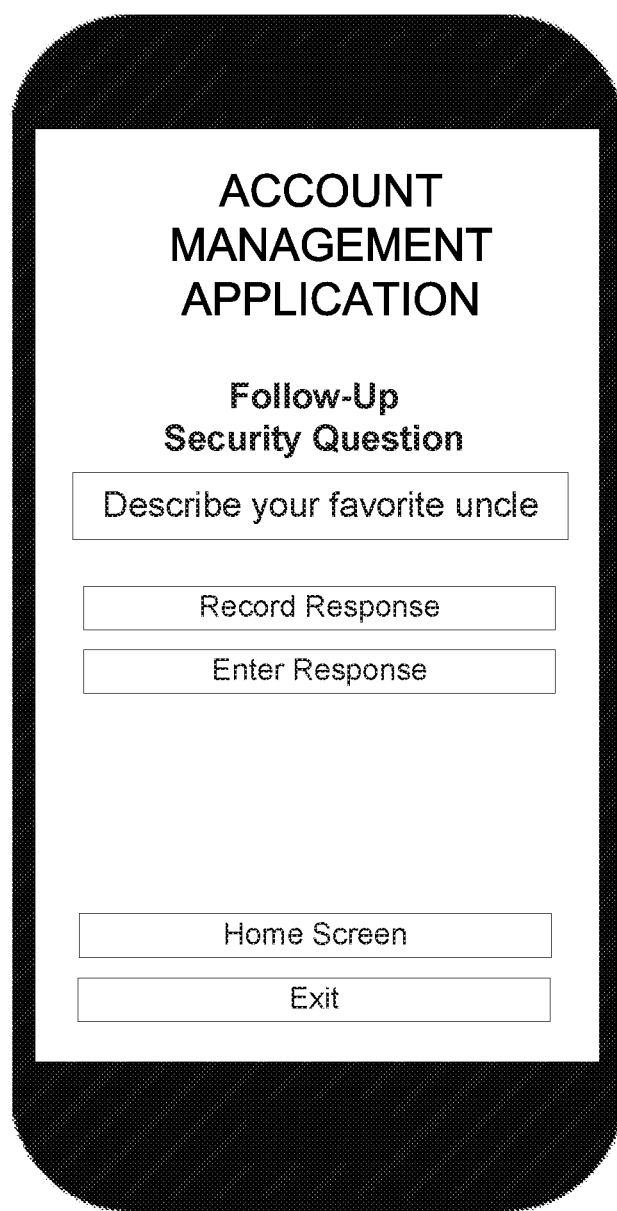

As shown in FIG. 5D, the application user interface 500 can present a follow-up question interface 540. For example, if the account management application determines that the user's response to the security question did not receive a sufficient similarity score, one or more follow-up questions can be presented on the follow-up question interface 540. Similar to the security question interface 520, the follow-up question interface can offer the user choices for the manner in which these questions may be answered. It is understood, however, that it may not be necessary to present the follow-up question interface 540 if, for example, the user's response to the security question achieved a sufficient similarity score.

Figure 5E:
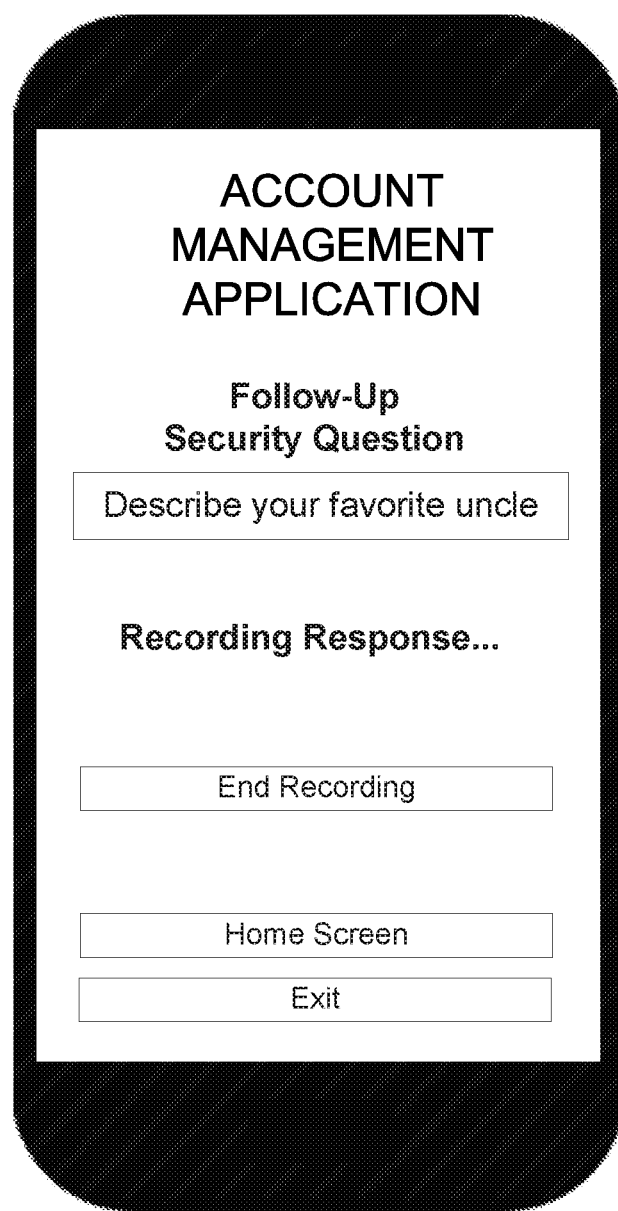

As shown in FIG. 5E, the application user interface 500 can present a follow-up question response entry interface 550 through which the user can enter a response to the security question. Similar to FIG. 5C, in the example illustrated in FIG. 5E, the user has chosen to record an oral response to the follow-up security questions via the follow-up question response entry interface 550.

Figure 5F:
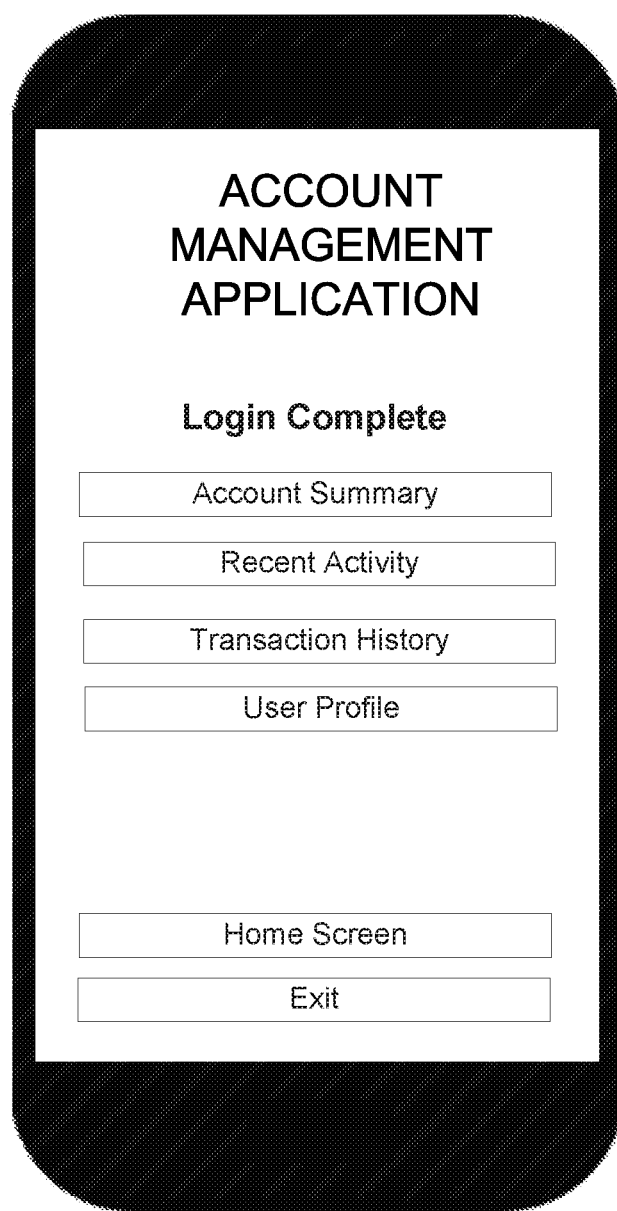

As shown in FIG. 5F, the application user interface 500 can present a login complete interface 550 upon a successful login. This interface can be displayed upon entry of one or responses to one or more security question and/or follow-up security questions, and this interface can provide access to account data and account management tools.

Some examples of the present disclosure refer to online accounts, however, the present disclosure is not limited thereto. It is understood that the teachings of the present disclosure are applicable to all accounts, including accounts relating to local systems as well as online accounts.

Further, the present disclosure is not limited to a certain type of account. It is understood that the present disclosure includes, without limitation, financial accounts (e.g., savings, checking, credit card, debit card, mortgage, loan, brokerage, retirement, and cryptocurrency accounts), service accounts (e.g., data backups, music and video content, and digital archives), utility accounts (e.g., utilities and home security accounts), entertainment accounts (e.g., video streaming, gaming and entertainment), and others.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A data access control system, comprising:
 a server comprising a microprocessor and a memory containing a database storing login credentials for an account associated with a user, wherein the login credentials include a security question and a narrative response associated with the security question;

wherein, the server is configured to:
identify a plurality of nouns in the narrative response, and
identify one or more relationships between each of the plurality of nouns in the narrative response; and
wherein, upon receipt of a request to access the account from a client device, the server is configured to:
transmit the security question to the client device,
receive a user input from the client device in response to the security question,
identify a plurality of nouns in the user input,
identify one or more relationships between each of the plurality of nouns in the user input,
compare the user input to the narrative response stored in the database and calculate a similarity score based on the comparison,
match one or more nouns in the user input to one or more nouns in the narrative response and increase the similarity score by a first amount for each noun in the user input matched to a noun in the narrative response,
match one or more relationships between the plurality of nouns in the user input to one or more of the relationships between the plurality of nouns in the narrative response and increase the similarity score by a second amount for each relationship in the user input matched to a relationship in the narrative response, and
approve the request to access the account if the similarity score exceeds a threshold.

2. The data access control system of claim 1, wherein the user input is one or more of a voice input and a text input.

3. The data access control system of claim 1, wherein:
the user input is a voice input, and
the server is configured to convert the voice input into text for comparison with the narrative response.

4. The data access control system of claim 1, wherein:
the user input is a voice input and the narrative response is another voice input, and
the server is configured to compare at least one of articulation, diction, and tone of the user input to at least one of articulation, diction, and tone of the narrative response.

5. The data access control system of claim 1, wherein the second amount is greater than the first amount.

6. A method of data access control for a user account, comprising:
transmitting a first security question;
receiving a first narrative response in response to the first security question;
storing the first narrative response in a database and associating the first narrative response with the first security question in the database;
receiving a request to access the user account by the user;
transmitting the first security question to the user;
receiving a first user input by the user in response to the first security question;
comparing the first user input to the first narrative response to calculate a first similarity score;
identifying one or more nouns present in both the first user input and the first narrative response and increasing the first similarity score for each noun present in both the first user input and the first narrative response;
identifying one or more relationships between nouns present in both the first user input and the first narrative response and increasing the first similarity score for each relationship present in both the first user input and the first narrative response;
approving the user's request to access the user account if the first similarity score exceeds a first threshold.

7. The method of claim 6, further comprising:
identifying one or more nouns present in the first user input and not present in the first narrative response; and
decreasing the first similarity score for each noun present in the first user input and not present in the first narrative response.

8. The method of claim 7, further comprising:
identifying one or more relationships between nouns present in the first user input and not present in the first narrative response; and
decreasing the first similarity score for each relationship present in the first user input and not present in the first narrative response.

9. The method of claim 6, further comprising:
transmitting a second security question;
receiving a second narrative response in response to the second security question;
storing the second narrative response in the database and associating the second narrative response with the second security question in the database; and
upon determining the first similarity score is less than the first threshold:
transmitting the second security question to the user,
receiving a second user input in response to the second security question,
comparing the second user input to the second narrative response to calculate a second similarity score, and
approving the user's request to access the user account if the second similarity score exceeds the first threshold.

10. The method of claim 9, further comprising:
upon determining the second similarity score is less than the first threshold, calculating a combined similarity score by adding the first similarity score to the second similarity score; and
approving the request to access the user account if the combined similarity score exceeds a second threshold.

11. A non-transitory machine-readable medium having stored thereon an application for account access control, the application comprising program code for execution by a processor, the application configured to:
access a database, the database including a voice response;
receive a voice input;
calculate a similarity score by:
identifying one or more nouns present in both the voice input and the voice response, identifying one or more relationships between nouns present in both the voice input and the voice response, identifying one or more speech matches between the voice input and the voice response, wherein the one or more speech matches include at least one of a similarity in articulation, a similarity in diction, and a similarity in tone, increasing the similarity score for each noun present in both the voice input and the voice response, each relationship present in both the voice input and the voice response, and each speech match,
identifying one or more nouns present in the voice response and not present in the voice input, identifying one or more relationships between nouns present in the voice response and not present in the voice input, identifying one or more speech characteristics present in the voice response and not present in the voice input, decreasing the similarity score for each noun present in the voice response and not present in the voice input, each relationship present in the voice response and not present in the voice input, and each speech characteristic present in the voice response and not present in the voice input, and determine if the similarity score exceeds a threshold for account access.

12. The data access control system of claim 1, wherein the server is further configured to identify one or more nouns in the narrative response that are not present in the user input and decrease the similarity score by a third amount for each noun in the narrative response that is not present in the user input.

13. The data access control system of claim 12, wherein the server is further configured to identify one or more relationships between the one or more nouns in the narrative response that are not present in the user input and decrease the similarity score by a fourth amount for each relationship in the narrative response that is not present in the user input.

14. The method of claim 6, further comprising identifying one or more nouns present in the first narrative response and not present in the first user input and decreasing the first similarity score for each noun present in the first narrative response and not present in the first user input.

15. The method of claim 14, further comprising identifying one or more relationships between nouns present in the first narrative response and not present in the first user input and decreasing the first similarity score for each relationship present in the first narrative response and not present in the first user input.

16. The data access control system of claim 13, wherein the fourth amount is greater than the third amount.

* * * * *